US008535142B2

(12) United States Patent
Aoki

(10) Patent No.: US 8,535,142 B2
(45) Date of Patent: Sep. 17, 2013

(54) WAGERING GAME WITH GAME APPEARANCE CHANGING BASED ON PLAYER'S SELECTION

(75) Inventor: Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 498 days.

(21) Appl. No.: 12/944,328

(22) Filed: Nov. 11, 2010

(65) Prior Publication Data

US 2011/0118002 A1 May 19, 2011

Related U.S. Application Data

(60) Provisional application No. 61/261,156, filed on Nov. 13, 2009.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................................... 463/20; 463/21

(58) Field of Classification Search

USPC .................................... 463/20, 21

See application file for complete search history.

(56) References Cited

U.S. PATENT DOCUMENTS

| | | | | |
|---|---|---|---|---|
| 5,393,057 A | 2/1995 | Marnell, II | | |
| 6,068,553 A | 5/2000 | Parker | | |
| 7,431,646 B2 | 10/2008 | Jackson | | |
| 7,662,040 B2 | 2/2010 | Englman et al. | | |
| 7,780,531 B2 | 8/2010 | Englman et al. | | |
| 8,313,369 B2 * | 11/2012 | Acres | ......... | 463/22 |
| 2005/0096121 A1 | 5/2005 | Gilliland et al. | | |
| 2010/0099482 A1 * | 4/2010 | O'Connor et al. | ......... | 463/20 |
| 2010/0137047 A1 | 6/2010 | Englman et al. | | |

FOREIGN PATENT DOCUMENTS

| | | |
|---|---|---|
| WO | 2008/024330 A2 | 2/2008 |
| WO | 2009/061383 A1 | 5/2009 |
| WO | 2009/061463 A1 | 5/2009 |
| WO | 2010/002794 A1 | 1/2010 |

OTHER PUBLICATIONS

Atronic Brochure: "Tree of Riches;" Nov. 2008; 2 pages.

Strictly Slots Article: "Tree of Riches," Atronic Americas; Nov. 2008; 1 page.

GGB Staff: Global Gaming Business Article, "Atronic Group: New Era;" Nov. 4, 2008; 5 pages.

Australian Patent Examination Report No. 1, Patent Application No. 2010241377, Jan. 4, 2012 (2 pages).

Australian Patent Examination Report No. 2, Patent Application No. 2010241377, Sep. 20, 2012 (3 pages).

* cited by examiner

*Primary Examiner* — William M. Brewster

(74) *Attorney, Agent, or Firm* — Nixon Peabody LLP

(57) ABSTRACT

A method of conducting a wagering game on a gaming terminal for a player includes receiving, via an input device, a player selection of one of a plurality of player selectable elements. Each of the player selectable elements are associated with a corresponding thematic indicia set. The method further includes conducting the wagering game with the thematic indicia set associated with the selected player selectable element being displayed on a display of the gaming terminal and while conducting the wagering game, triggering a bonus event. The method further includes awarding one of a plurality of game enhancement parameters to the player during the bonus event. The awarded one of the plurality of game enhancement parameters is dictated by the selected player selectable element.

26 Claims, 9 Drawing Sheets

WAGERING GAME WITH GAME APPEARANCE CHANGING BASED ON PLAYER'S SELECTION

CROSS-REFERENCE TO RELATED APPLICATION

This application claims the benefit of U.S. Provisional Patent Application No. 61/261,156, filed Nov. 13, 2009, entitled "Wagering Game With Game Appearance Changing Based On Player's Selection," which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to wagering games with a changing game appearance based on player selection.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Some of the wagering games played on the gaming machines include a single non-modifiable theme carried throughout the wagering game.

SUMMARY OF THE INVENTION

According to one aspect of the present disclosure, a method of conducting a wagering game on a gaming terminal for a player includes receiving, via an input device, a player selection of one of a plurality of player selectable elements. Each of the player selectable elements are associated with a corresponding thematic indicia set. The method further includes conducting the wagering game with the thematic indicia set associated with the selected player selectable element being displayed on a display of the gaming terminal and while conducting the wagering game, triggering a bonus event. The method further includes awarding one of a plurality of game enhancement parameters to the player during the bonus event. The awarded one of the plurality of game enhancement parameters is dictated by the selected player selectable element.

According to another aspect of the disclosure, a method of conducting a wagering game on a gaming terminal for a player includes receiving, via an input device, a player selection of one of a plurality of player selectable elements. Each of the player selectable elements is associated with a corresponding thematic indicia set. The method further includes conducting the wagering game with the thematic indicia set associated with the selected player selectable element being displayed on a display of the gaming terminal and while conducting the wagering game, triggering a bonus event. The method further includes randomly selecting, via one or more processors, one of a plurality game enhancements parameters. The randomly selected game enhancement parameter is associated with one of the plurality of player selectable elements. In response to the player selected player-selectable element matching the player selectable element associated with the randomly selected game enhancement parameter, the method includes awarding the randomly selected game enhancement parameter to the player during the bonus event.

According to another aspect of the disclosure, a method of conducting a wagering game on a plurality of gaming terminals networked with a server includes receiving, via a first input device on a first gaming terminal, a first selection of a first one of a plurality of player selectable elements by a first player. Each of the player selectable elements is associated with a corresponding thematic indicia set. The method further includes receiving, via a second input device on a second gaming terminal, a second selection of a second one of the plurality of player selectable elements by a second player. The second one of the plurality of player selectable elements is different from the first one of the plurality of player selectable elements. The method further includes conducting the wagering game on the first gaming terminal with the thematic indicia set associated with the first selection being displayed on a display of the first gaming terminal. The method further includes conducting the wagering game on the second gaming terminal with the thematic indicia set associated with the second selection being displayed on a display of the second gaming terminal. The method further includes while conducting the wagering games on the first gaming terminal and the second gaming terminal, triggering a bonus event and randomly selecting, via one or more processors in the server, one of the plurality of player selectable elements to which to provide a game enhancement parameter. The method further includes awarding the game enhancement parameter to the first player during the bonus event due to the first player's selected player selectable element matching the randomly selected player selectable element.

According to yet another aspect of the invention, computer readable storage media is encoded with instructions for directing a gaming system to perform the above methods.

According to another aspect of the disclosure, a gaming terminal for conducing a wagering game includes at least one input device, at least one display, and at least one processor. The at least one input device is configured to receive a selection of one of a plurality of player selectable elements from a player. Each of the player selectable elements is associated with a corresponding thematic indicia set. The at least one display is configured to display the wagering game with the thematic indicia set associated with a selected one of the player selectable elements. The at least one processor is configured to (1) trigger a bonus event, (2) randomly select one of the plurality of player selectable elements to which to award a game enhancement parameter, and (3) award the game enhancement parameter to the player in response to the player's selected player selectable element matching the player selectable element randomly-selected by the at least one processor.

Additional aspects of the invention will be apparent to those of ordinary skill in the art in view of the detailed description of various embodiments, which is made with reference to the drawings, a brief description of which is provided below.

Figure 1:
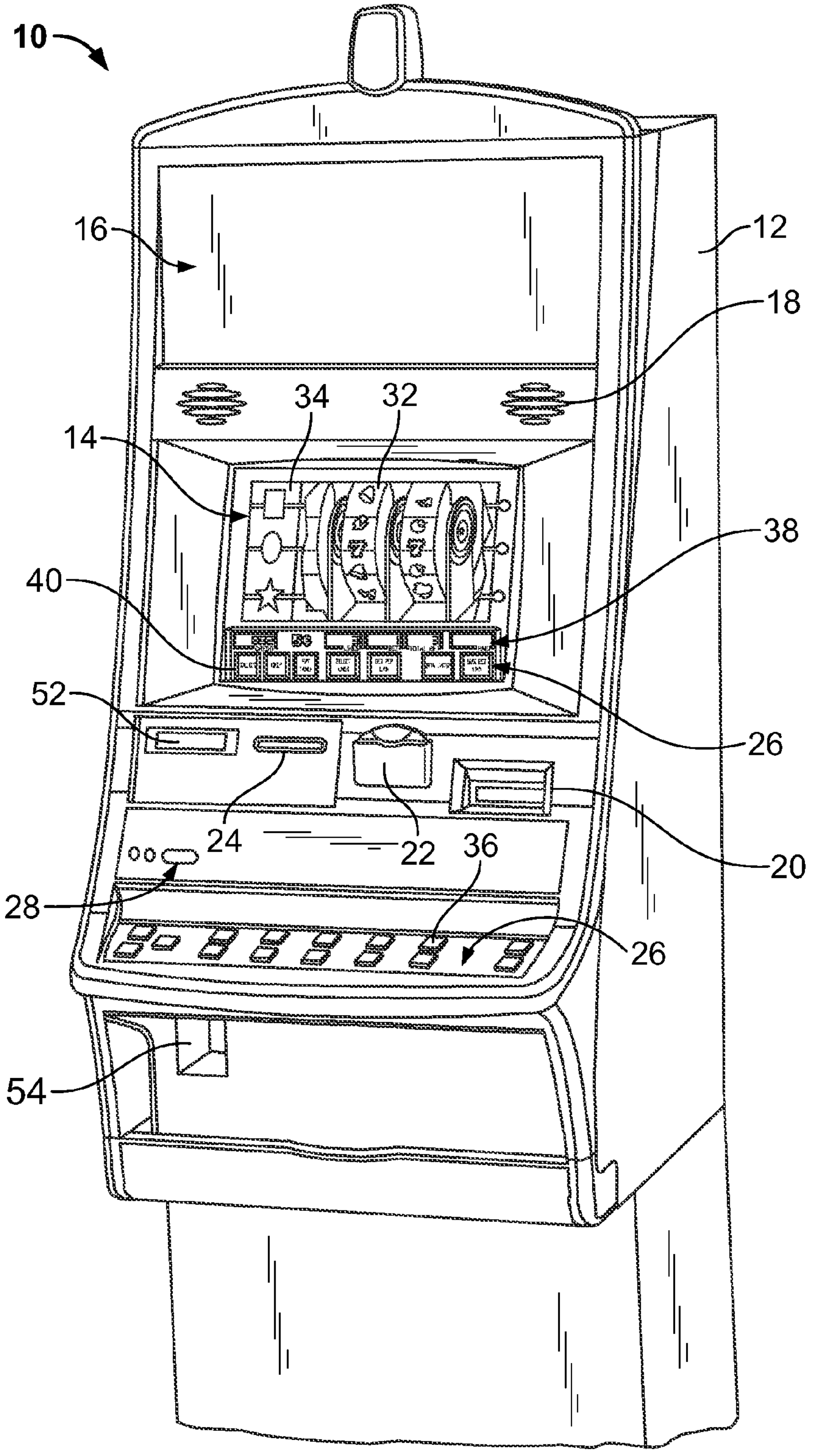
FIG. 1 (Prior Art)
FIG. 1 is a perspective view of a free-standing gaming terminal according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled “Handheld Device for Wagering Games,” which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled “Reel Spinning Slot Machine With Superimposed Video Image,” which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or “real-life” images, either prerecorded (e.g., in the case of marketing/ promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
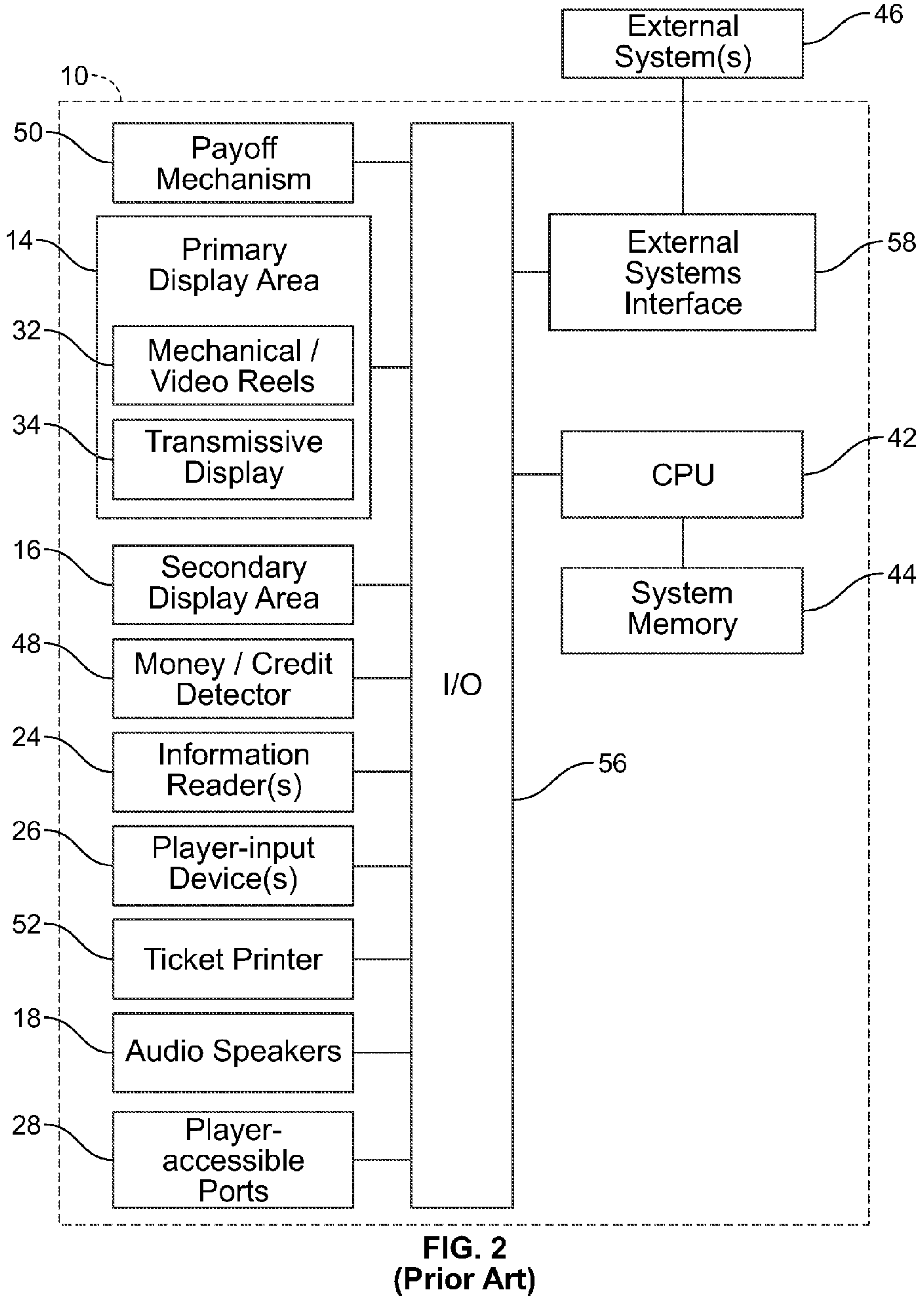
FIG. 2 (Prior Art)
FIG. 2 is a schematic view of a gaming system according to an embodiment of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
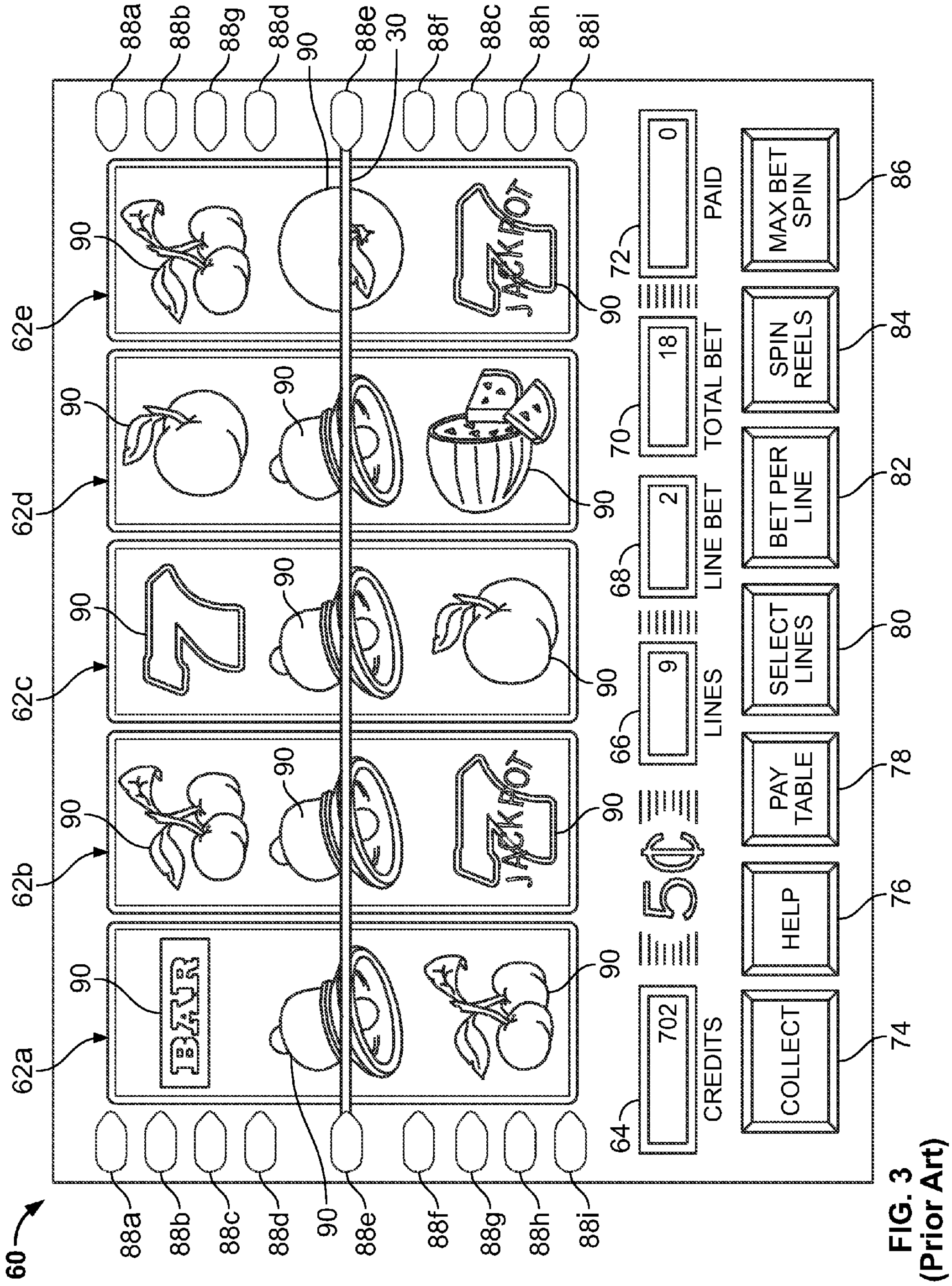
FIG. 3 (Prior Art)
FIG. 3 is an image of an exemplary basic-game screen of a wagering game displayed on a gaming terminal, according to an embodiment of the present disclosure.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
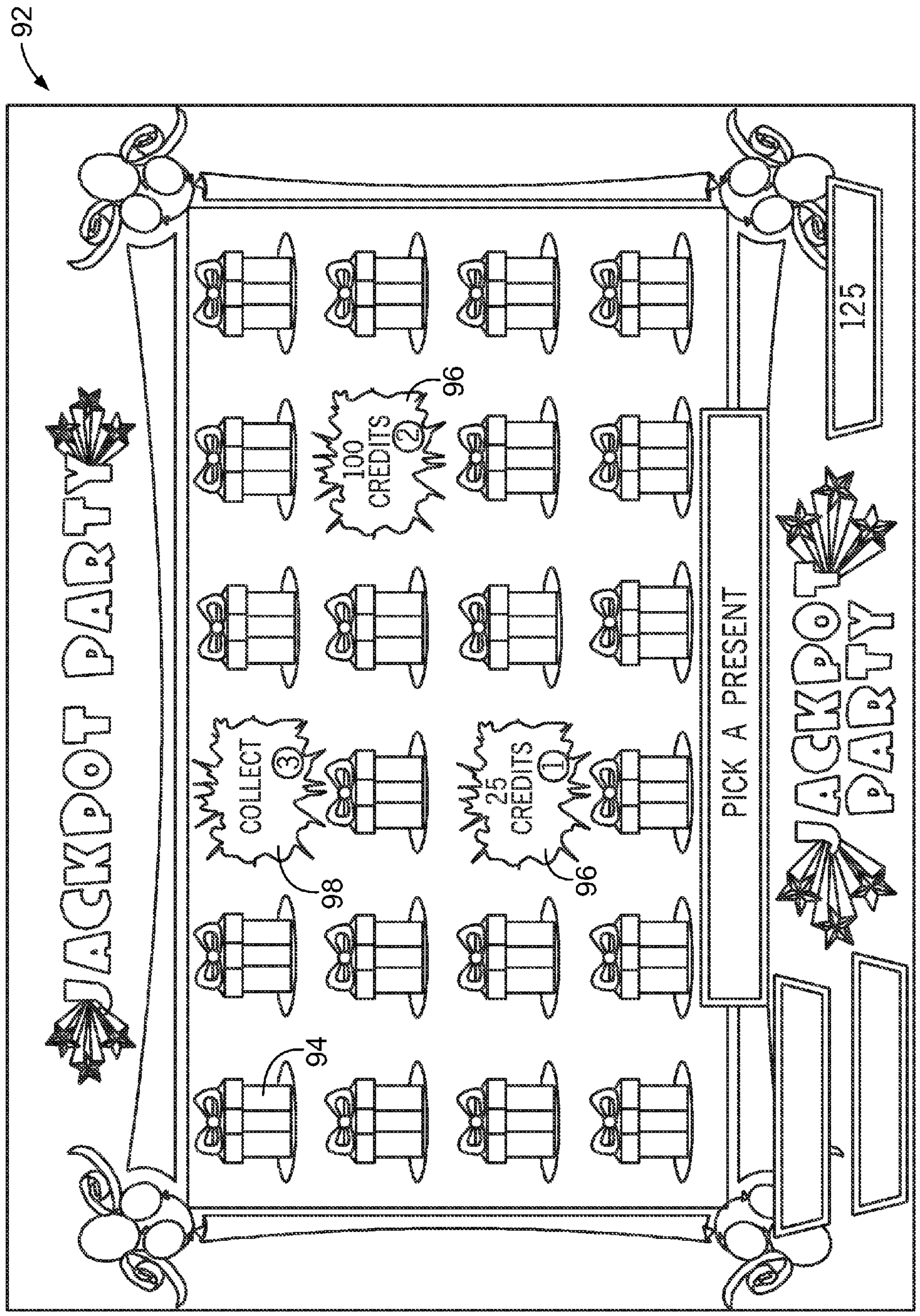
FIG. 4 (Prior Art)
FIG. 4 is an image of a bonus-game screen of an exemplary wagering game displayed on a gaming terminal, according to an embodiment of the present disclosure.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
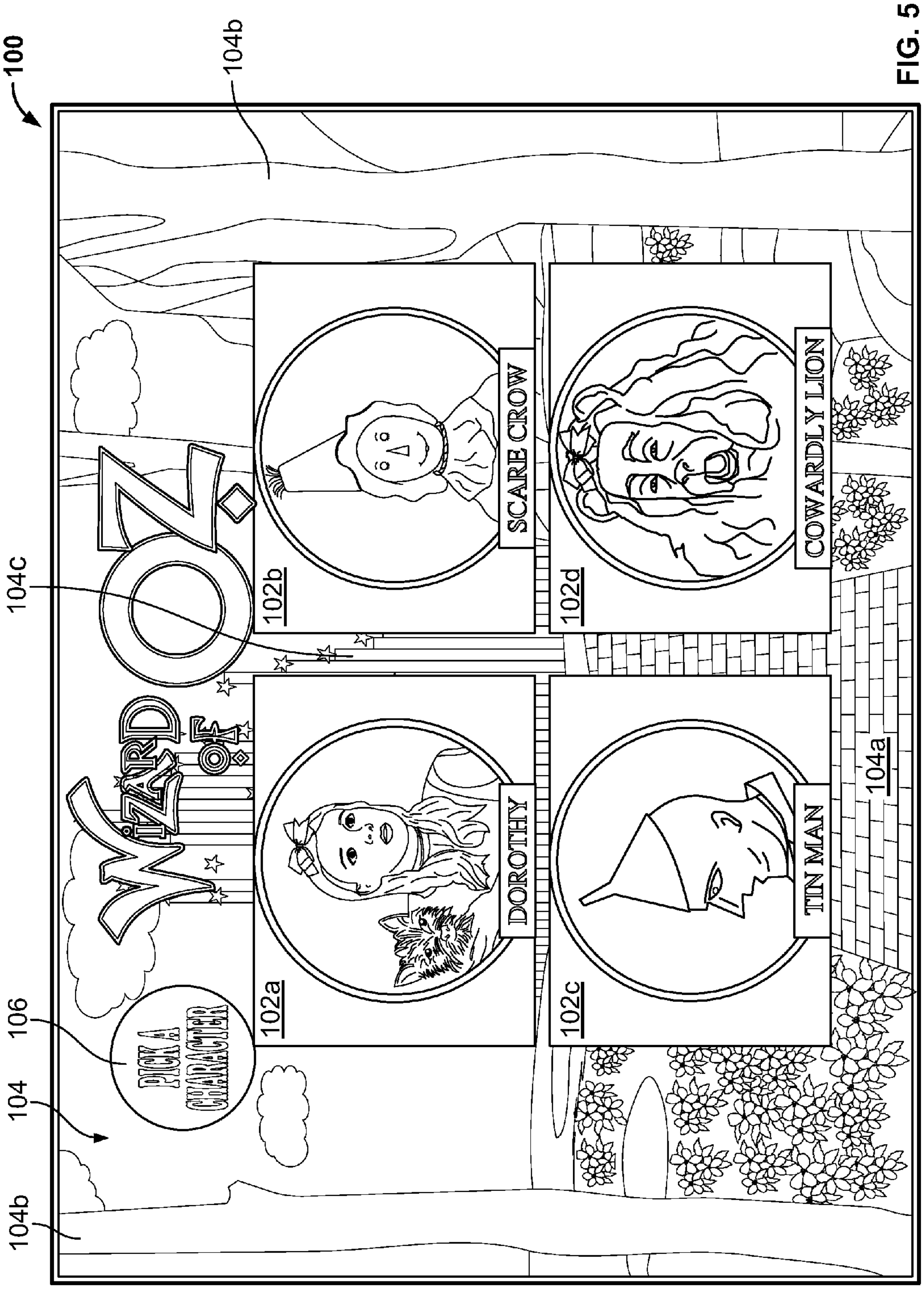
FIG. 5 is an image of a theme selection screen of a wagering game displayed on a gaming terminal according to an embodiment of the present disclosure.

Referring now to FIG. 5, a player selection screen 100 is shown. The player selection screen 100 can be displayed on the primary display area 14 and/or the secondary display area

16 of the gaming terminal 10. The player selection screen 100 includes a plurality of player selectable elements 102*a-d*. Each of the plurality of player selectable elements 102*a-d* is associated with a thematic indicia set. The first player selectable element 102*a* is associated with a first thematic indicia set, which includes indicia related to, for example, Dorothy from the Wizard of OZ. The second player selectable element 102*b* is associated with a second thematic indicia set, which includes indicia related to, for example, Scare Crow from the Wizard of OZ. The third player selectable element 102*c* is associated with a third thematic indicia set, which includes indicia related to, for example, Tin Man from the Wizard of OZ. The fourth player selectable element 102*d* is associated with a fourth thematic indicia set, which includes indicia related to, for example, Cowardly Lion from the Wizard of OZ.

FIG. 5 also illustrates a "skin" 104, which is generally described as a collection of background images and/or indicia that are associated with a general game theme, such as, for example, the Wizard of OZ. The skin 104 is generally contained in a background of the player selection screen 100 such that the player selectable elements 102*a-d* are displayed above or on top of the skin 104. As shown in FIG. 5, the skin 104 includes a yellow brick road 104*a*, trees 104*b*, and a castle 104*c*, all of which are associated with the Wizard of OZ general game theme. Alternatively, the skin 104 can be modified to include additional or different thematic indicia or symbols that are associated with indicia from one of the four thematic indicia sets.

As described below, selection of one of the plurality of player selectable elements 120*a-d* on the player selection screen 100 can result in (1) modification of the basic set of symbols 90 to include thematic indicia symbols, (2) modification of a basic skin 104 to include thematic indicia, and/or (3) awarding one or more player enhancement parameters.

Prior to initiating play of a basic wagering game on the gaming terminal 10, a player selects one of the plurality of player selectable elements 102*a-d*. The player selectable elements 102*a-d* on the player selection screen 100 can be soft-key or touch-key elements that are activated by the player pressing the player selectable elements 102*a-d* on the player selection screen 100. Alternatively, the player can use one or more push buttons on the gaming terminal 10 to select and activate one of the player selectable elements 102*a-d*. A player can revisit the player selection screen 100 by pressing or activating the "Pick A Character" element 106. It is contemplated that a player can change the selected thematic indicia set during predetermined times in the basic wagering game and/or during a community game, discussed below. The player can change the thematic indicia set an unlimited number of times or a preset number of times during a gaming session.

Figure 6:
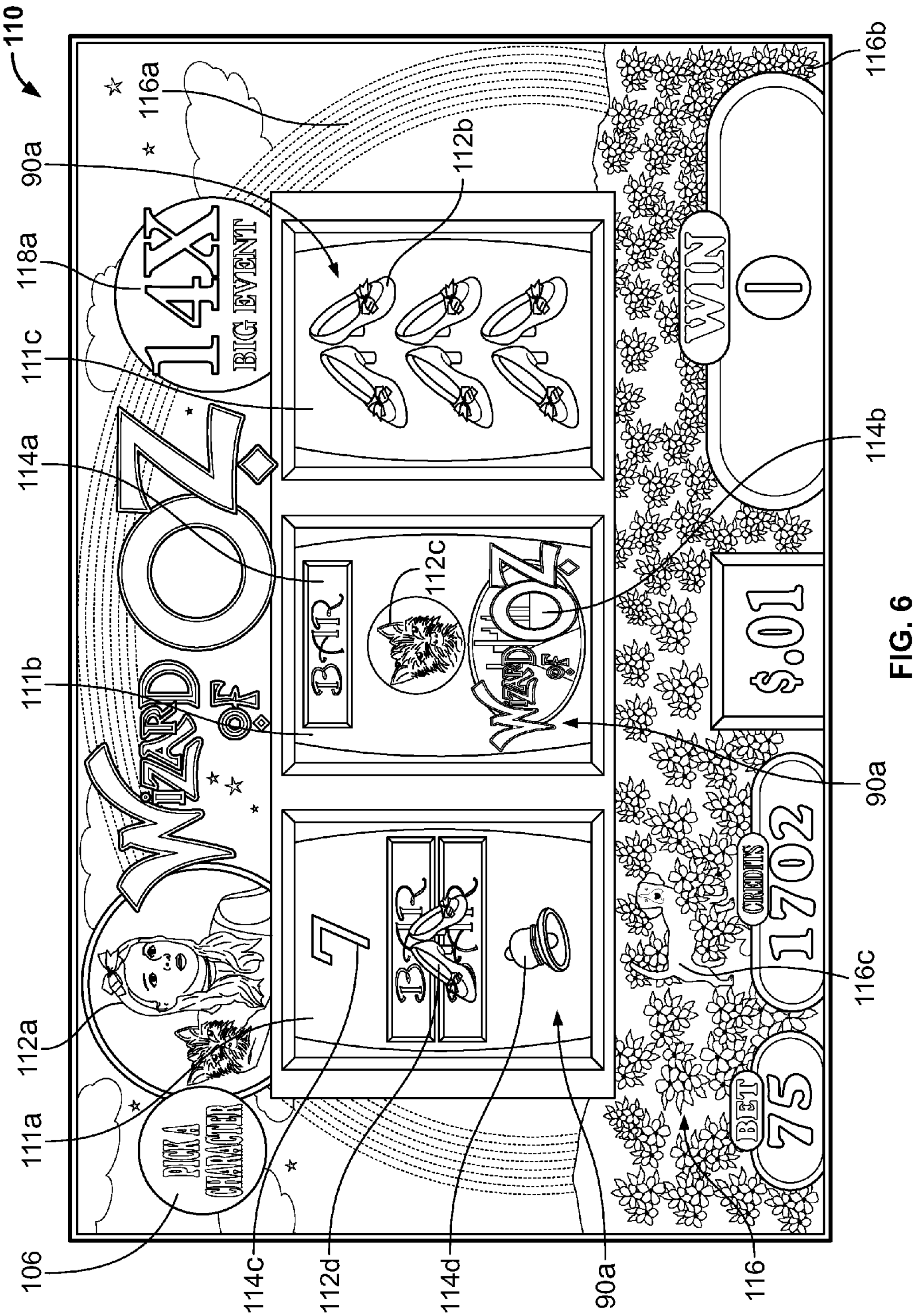
FIG. 6 is an image of a modified basic game screen including thematic indicia displayed on a gaming terminal according to an embodiment of the present disclosure.

Referring to FIG. 6, a basic wagering game screen 110 is shown having a modified set of symbols 90*a* and a modified skin 116. The basic wagering game screen 110 is modified to include the first thematic indicia set in response to a player selecting the first player selectable element 102*a* ("Dorothy"). The basic-game screen 110 includes a wagering game similar to the one described above in reference to FIGS. 1-3. The basic wagering game screen 110 includes the modified set of symbols 90*a* that are displayed on a plurality of reels 111*a-c* to indicate possible outcomes of the basic wagering game. The plurality of symbols 90*a* include a plurality of basic symbols 114*a-d* and a plurality of first thematic symbols 112*a-d* from the first thematic indicia set. That is, the selection of the first player selectable element 102*a* also modifies the plurality of symbols 90, shown in FIG. 3, used to indicate possible outcomes of the basic wagering game to include thematic symbols.

Each of the first thematic symbols 112*a-d* is related to Dorothy, a character from the Wizard of OZ, which is the general theme of the basic wagering game. A first one of the first thematic symbols 112*a* is an image of Dorothy holding her dog, "Toto." A second one of the first thematic symbols 112*b* is an image of Dorothy's red shoes. A third one of the first thematic symbols 112*c* is an image of Dorothy's dog Toto. A fourth one of the first thematic symbols 112*d* is an image of Dorothy's red shoes in combination with a basic symbol. Each of the first thematic symbols 112*a-d* is incorporated into the basic wagering game thereby modifying the appearance of the basic wagering game. The modification of the basic wagering game appearance using the first thematic symbols increases the player's enjoyment when playing the wagering game because the player is allowed to directly control symbols and a general look of the wagering game.

Alternatively or in additional to modifying the symbols 90*a* of the basic game screen 110, the selection of the first player selectable element 102*a* further modifies the skin of the basic wagering game. As shown in FIG. 6, the general game theme skin 104 is modified to include one or more indicia associated with the selected first thematic indicia set to result in modified skin 116. For example, the skin 116 can be modified to include images associated with the selected first thematic indicia set, such as, for example, images, graphics, or animations of a rainbow 116*a*, flowers 116*b*, and/or Dorothy's dog, Toto 116*c*, walking or running around the basic wagering game screen 110.

It is contemplated that one or more of the images, graphics, or animations of the modified skin 116 can interact with one or more of the symbols included on the reels 111*a-c*. For example, the Toto animation 116*c* can jump from the skin 116 onto one of the reels 111*a-c*. After jumping onto a reel 111*a-c*, Toto can become an active symbol on that reel that affects an outcome of the basic wagering game. Alternatively or additionally, Toto can manipulate one or more of the reels 111*a-c* to change a displayed outcome by, for example, nudging a reel or by spinning a reel with a paw before or after the reel has stopped.

The basic wagering game screen 110 further includes a community event or bonus game multiplier 118*a*. The community event multiplier 118*a* can be accumulated by a player during play of the basic wagering game. The player accumulates the community event multiplier 118*a* based on the player's rate of play or coin-in while playing the basic wagering game. That is, the player's community event multiplier 118*a* increases or decreases based on how fast or slow the player plays the basic wagering game. As shown, the player has currently accumulated a community event multiplier 118*a* of 14×.

Figure 7:
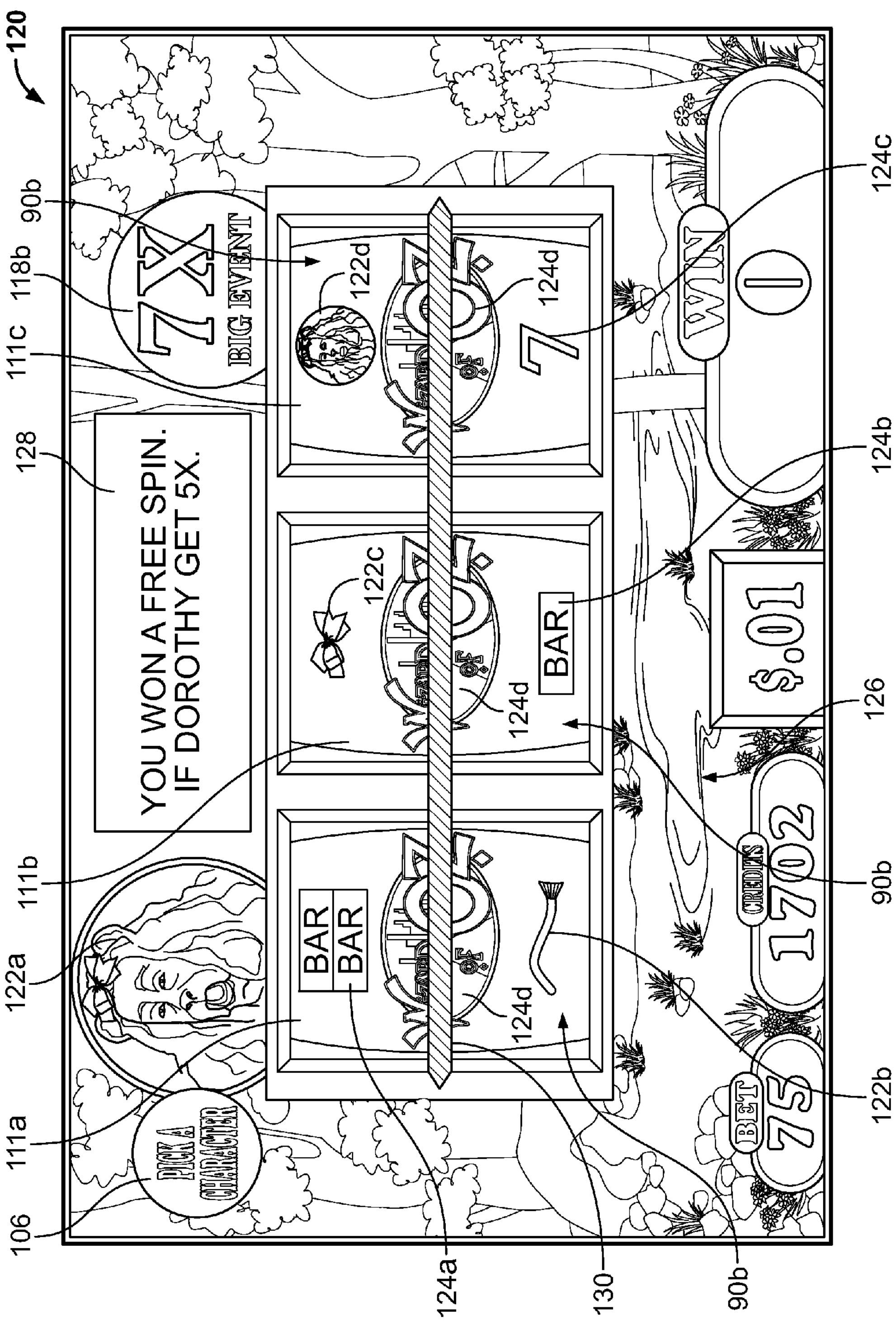
FIG. 7 is an image of a modified basic game screen including thematic indicia displayed on a gaming terminal according to an embodiment of the present disclosure.

Referring to FIG. 7, a basic game screen 120 is shown having a modified set of symbols 90*b* and a modified skin 126. As shown, the modified set of symbols 90*b* and the modified skin 126 are related to the "Cowardly Lion." A player can change the thematic indicia set applied to modify the basic wagering game between plays or spins of the basic wagering game by selecting the "Pick A Character" element 106 to return the player to the player selection screen 100 shown in FIG. 5. As described above, selection of the same or a different player selectable element 102*a-d* as previously selected returns the player to the basic wagering game with the selected thematic indicia set modifying the basic set of symbols 90 and the basic skin 104.

Additionally, the basic wagering game screen 120 further includes a community event or bonus game multiplier 118*b*. The community event multiplier 118*b* is similar to the community event multiplier 118*a* described above. As shown, the player has currently accumulated a community event multiplier 118*b* of 7×. The player's community event multiplier 118*b* decreased from 14×, as shown in FIG. 6, to 7×, due to, for example, the player decreasing his or her rate of coin-in.

As shown in FIG. 7, the basic wagering game screen 120 is modified to include the fourth thematic indicia set in response to a player selecting the fourth player selectable element 102*d*. The basic wagering game screen 120 is similar to the basic wagering game screen 110, but rather than being associated with the first thematic indicia set ("Dorothy"), the basic game screen 120 is associated with the fourth thematic indicia set ("Cowardly Lion"). The basic wagering game screen 120 includes the modified set of symbols 90*b* that are displayed on the plurality of reels 111*a-c* to indicate possible outcomes of the basic wagering game. The plurality of symbols 90*b* include a plurality of basic symbols 124*a-d* and a plurality of fourth thematic symbols 122*a-d* from the fourth thematic indicia set.

Each of the fourth thematic symbols 122*a-d* is related to the Cowardly Lion, another character from the Wizard of OZ. A first one of the fourth thematic symbols 122*a* is an image of the Cowardly Lion. A second one of the fourth thematic symbols 122*b* is an image of the Cowardly Lion's tail. A third one of the fourth thematic symbols 122*c* is an image of the Cowardly Lion's bow. A fourth one of the fourth thematic symbols 122*d* is a second image of the Cowardly Lion. Each of the fourth thematic symbols 122*a-d* is incorporated into the basic wagering game thereby modifying the appearance of the basic wagering game based on the player's selection of the fourth player selectable element 102*d* on the player selection screen 100.

Alternatively or additionally to modifying the symbols 90*b* of the basic game screen 120, the selection of the fourth player selectable element 102*d* further modifies the skin of the basic wagering game. As shown in FIG. 7, the general game theme skin 104 is modified to include one or more indicia associated with the selected fourth thematic indicia set to result in modified skin 126.

In addition to a player's selection of one of the player selectable elements 102*a-d* modifying (1) the set of symbols used to indicate possible outcomes of the basic wagering game to include thematic symbols and/or (2) the skin of the basic wagering game, the player's selection can also affect an award of one or more game enhancement parameters. These game enhancement parameters are typically applied to a bonus game, but the game enhancement parameters may also be applied to the basic wagering game.

As shown in FIG. 7, a winning combination of three like symbols 124*d* are aligned on an active payline 130. In response to the winning combination, the player can win credits, a free spin, a bonus game, and/or a game enhancement parameter. As shown in a pop-up window 128, the player won a free spin for achieving the winning symbol combination. The pop-up window 128 further indicates that if the player's currently selected theme is related to Dorothy, then the player further wins a 5× multiplier during that free spin in the basic wagering game. That is, if the player selected the player selectable element 102*a* that is associated with Dorothy, then the player further wins a 5× multiplier.

In the embodiment shown in FIG. 7, the player did not select the first player selectable element 102*a* related to Dorothy. Rather, the player selected the fourth player selectable element 102*d*, which is related to the Cowardly Lion. Thus, the player in this example only wins a free spin ("bonus event") and does not win the 5× multiplier. That is, the player's initial selection of the fourth player selectable element 102*d* associated with the Cowardly Lion affected one of the outcomes of the bonus event. Put another way, had the player initially selected the first player selectable element 102*a* related to Dorothy, the player would have won a bonus event that includes a free spin with the 5× multiplier applied to the free spin.

The added element of additional game enhancement parameters being awarded to a player based on that player's initial selection increases the player's enjoyment and anticipation while playing the basic wagering game. Additionally, the indication of the potentially awarded game enhancement parameter, such as the 5× multiplier in the pop-up window 128, further increases a player's enjoyment and anticipation while playing the basic wagering game.

The determination of awarding a game enhancement parameter is randomly decided by the gaming terminal 10, a central gaming server, or a combination thereof. That is, the gaming terminal 10 can operate as a thick client, an intermediate client, or a thin client as described above. For a stand alone gaming terminal, the gaming terminal operates as a thick client and makes the determination as to when to award a game enhancement parameter and to which one of the thematic indicia sets. For a networked gaming terminal communicatively coupled with one or more gaming servers, the gaming terminal operates as a thin client such that the one or more gaming servers can make the determination as to when to award a game enhancement parameter, to which connected gaming terminal, and to which one of the thematic indicia sets. Alternatively, in the situation in which a gaming terminal is within a network, the gaming terminal may still make the random determination as to when to award a game enhancement parameter and to which one of the thematic indicia sets.

The determination of awarding a game enhancement parameter involves at least two random selections. One or more processors and/or controllers are configured to make the at least two random determinations, which include: (1) randomly selecting which player selectable element to associate with an award and (2) randomly selecting one of a plurality of game enhancement parameters to be the award.

Figure 8A:
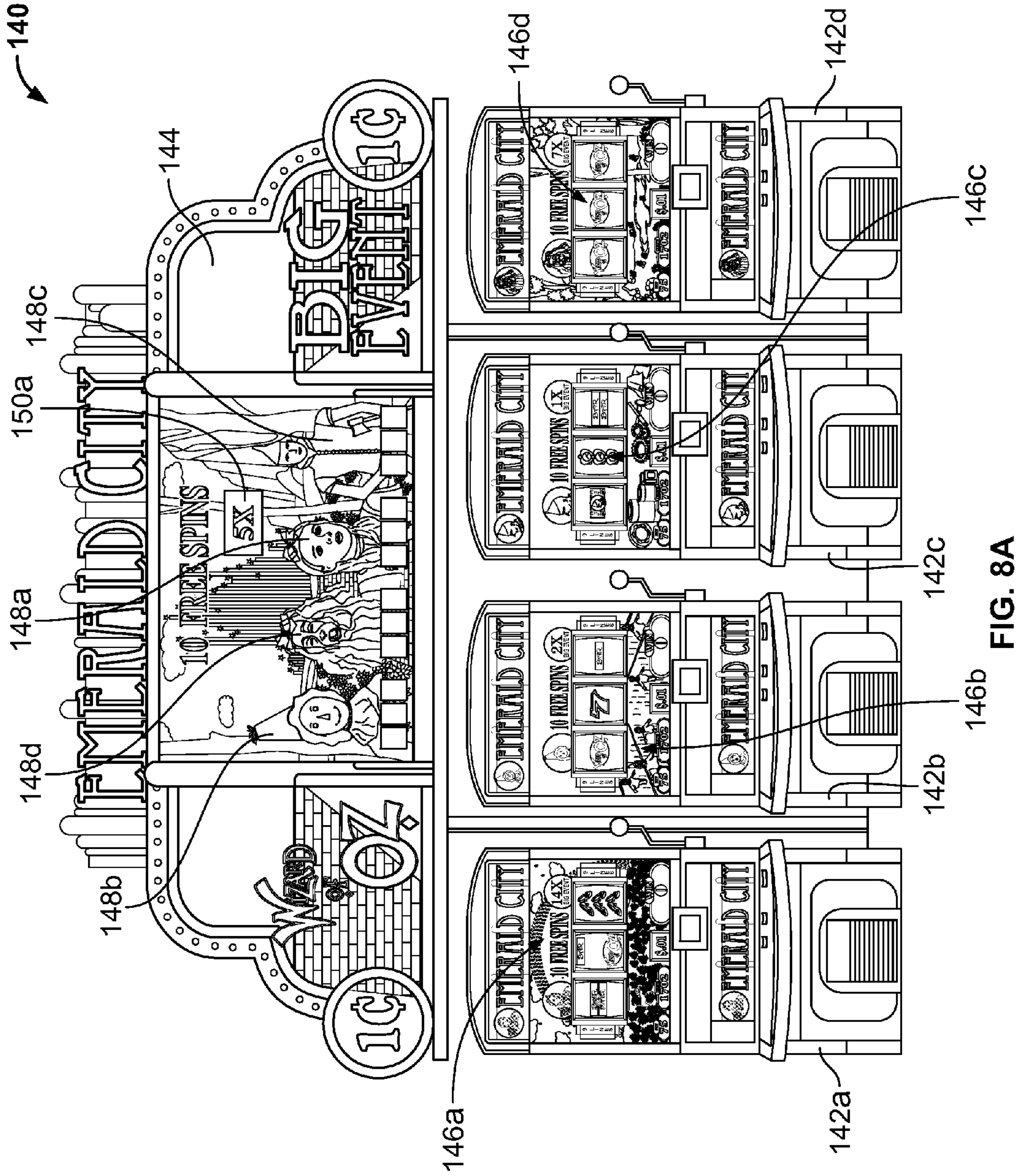
FIGS. 8A and 8B are front views of a community game according to an embodiment of the present disclosure.
Figure 8B:
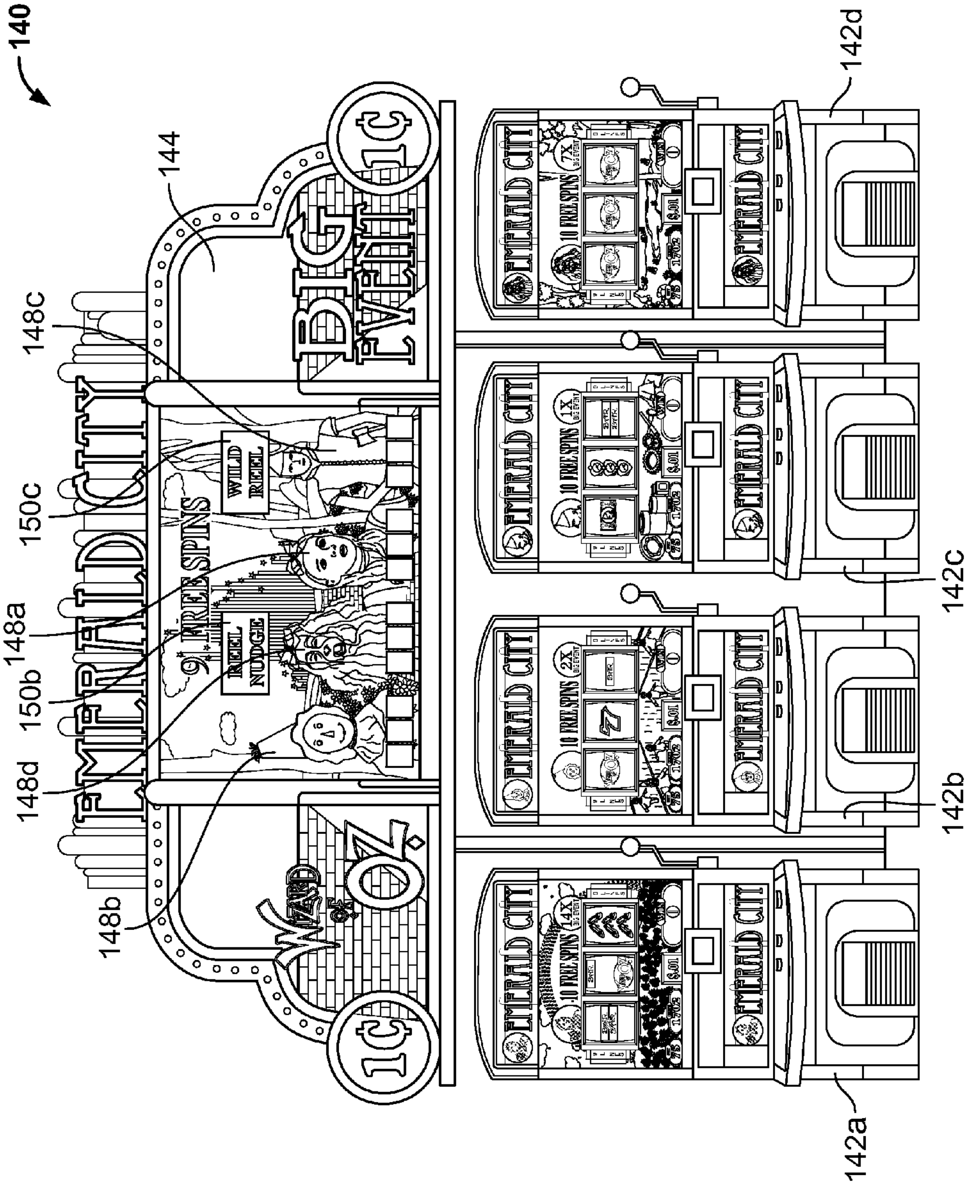

Now referring to FIGS. 8A and 8B, a community bonus game 140 having a general game theme, such as, for example, the Wizard of OZ, is shown. The community game 140 includes a plurality of gaming terminals 142*a-d* and a community display 144. A player's eligibility for the community game 140 is determined by a central gaming server based on some criteria, such as, for example, a player's rate of play or coin-in, while playing the basic wagering game. Examples of servers and determination of eligibility are described in commonly assigned U.S. Published Patent Application No. 2009/0042641, entitled "Wagering Game With Time-Based Bonus" and U.S. Published Patent Application No. 2009/0176556, entitled "Wagering Game System With Shared Outcome Determined By A Gaming Machine," both of which are hereby incorporated by reference herein in their entireties. Other method of determining a player's eligibility are contemplated.

Each of the plurality of gaming terminals 142*a-d* is the same as, or similar to, the gaming terminal 10 described above. That is, each of the plurality of gaming terminals 142*a-d* is configured to display a basic wagering game screen (e.g., basic wagering game screen 110, 120) that is modified to include a thematic indicia set in response to a player selecting one of the player selectable elements 102*a-d*. As shown in FIG. 8A, the first gaming terminal 142*a* is associated with the first thematic indicia set 146*a*, the second gaming terminal 142*b* is associated with the second thematic indicia set 146*b*, the third gaming terminal 142*c* is associated with the third thematic indicia set 146*c*, and the fourth gaming terminal 142*d* is associated with the fourth thematic indicia set 146*d*. It is contemplated that all of the gaming terminals 142*a-d* can be associated with the same or different ones of a plurality of thematic indicia sets because each player is permitted to choose his or her own theme.

Each of the thematic indicia sets 146*a-d* is represented with a character indicia 148*a-d* displayed on the community display 144. As shown in FIG. 8A, the first thematic set 146*a* is represented by a Dorothy indicia 148*a*, the second thematic set 146*b* is represented by a Scare Crow indicia 148*b*, the third thematic set 146*c* is represented by a Tin Man indicia 148*c*, and the fourth thematic set 146*d* is represented by a Cowardly Lion indicia 148*d*. In response to the gaming terminals 142*a-d* joining the community game 140, each terminal 142*a-d* is awarded 10 free spins as indicated on the community display 144. That is, all gaming terminals communicatively connected to the server and determined to be eligible for the community game 140 are awarded 10 free spins to be played in the community game 140.

In addition to awarding 10 free spins to all eligible gaming terminals, the server can randomly award one or more game enhancement parameters. The award of a game enhancement parameter can be based on a player's thematic indicia selection and/or the player's turnover or rate of coin-in, that is, how fast or slow the player plays the basic wagering game. As shown in FIG. 8A, a 5× multiplier 150*a* is awarded to players having selected the first thematic indicia set related to Dorothy by displaying a 5× multiplier above the Dorothy indicia 148*a* on the community display 144. That is, all players of eligible gaming terminals 142*a-d* that selected the first player selectable element 102*a* associated with the first thematic indicia set are additionally awarded a 5× multiplier 150*a* during the community game. As shown, only the first eligible gaming terminal 142*a* is associated with the first thematic indicia set. Thus, the 5× multiplier 150*a* is only applied to the first gaming terminal's 142*a* outcomes. As shown, the first eligible gaming terminal 142*a* previously accrued a community event multiplier 14× as shown in FIG. 8A. Thus, the awarded game enhancement parameter 150*a* is added to the 14× multiplier to result in a 19× multiplier. It is contemplated that an awarded game enhancement parameter can be awarded for all 10 free spins or for a portion of the 10 free spins of a community game, such as, for example, a new game enhancement parameter is applied to each spin.

The indication of awarded game enhancement parameters, such as the 5× multiplier 150*a*, during the community game 140 can be displayed on each eligible gaming terminal's primary display area 14, secondary display area 16, the community display 144, or a combination thereof. The indication of the awarded game enhancement parameter on the community display 144 can increase the enjoyment and anticipation of all community game players as the players are made aware that other players are winning additional game enhancements. It is contemplated that the award of a game enhancement parameter during the community game 140 is only displayed on a gaming terminal receiving the award, such as the first eligible gaming terminal 142*a*.

Referring to FIG. 8B, the community bonus game 140 is shown after the eligible gaming terminals 142*a-d* each played one of the 10 free spins. The server automatically spins the reels for each of the eligible gaming terminals 142*a-d* during play of the community game 140 such that all players progress through the community game 140 at the same pace. Prior to playing a second one of the ten free spins of the community game 140, the server can leave or remove any previously awarded game enhancement parameter, such as the 5× multiplier 150*a*. Alternatively or additionally, the server can then randomly award one or more different game enhancement parameters. That is, the sever can randomly determine prior to each spin of the community game 140 whether to award one or more game enhancement parameters and each player's selection of the player selectable elements 102*a-d* in the basic wagering game determines who receives the awarded game enhancement parameters.

As shown in FIG. 8B, a reel nudge 150*b* is awarded to players having selected the fourth thematic indicia set related to the Cowardly Lion and a wild reel 150*c* is awarded to players having selected the third thematic indicia set related to the Tin Man. That is, prior to playing a second one of the ten free spins of the community game 140, all players of eligible gaming terminals that selected the third player selectable element 102*c* associated with the third thematic indicia set 146*c* are additionally awarded a wild reel 150*c*. And all players of eligible gaming terminals that selected the fourth player selectable element 102*d* associated with the fourth thematic indicia set 146*d* are additionally awarded a reel nudge 150*b* during the community game.

As shown, the reel nudge 150*b* is only applied to the fourth eligible gaming terminal's 142*d* outcomes and the wild reel 150*c* is only applied to the third eligible gaming terminal's 142*c* outcomes. The reel nudge 150*b* is operable to move a stopped reel such that a displayed symbol that is partially on an active payline is nudged to completely place that symbol on the active payline, thereby resulting in a winning outcome.

As described above in reference to FIG. 7, the player won a 5× multiplier that was applied to a free spin in the basic wagering game. According to some alternative embodiments, the 5× multiplier can be added to the community event multiplier 118*b*. For the embodiment shown, the community event multiplier 118*b* would be increased to a 12× multiplier (7×+5×=12×). According to some other alternative embodiments, the 5× multiplier can be multiplied with the community event multiplier 118*b*. For the embodiment shown, the community event multiplier 118*b* would be increased to a 35× multiplier (7××5×=35×).

Yet according to some other alternative embodiments, the 5× multiplier can be stored in a player asset inventory for later use by the player in the basic game or the bonus event. Additionally, the player can store the 5× multiplier and/or other awarded game enhancement parameters in the player inventory for use in later gaming sessions at the same or different gaming terminal.

As described above in reference to FIGS. 8A and 8B, the community bonus game 140 includes the awarding of game enhancement parameters in a bonus reel spinning game. It is contemplated that game enhancement parameters can be awarded according to some embodiments of the present disclosure to be used in alternative bonus games or secondary games, such as, for example, the bonus game described above in reference to FIG. 4 and the bonus-game screen 92. According to some such embodiments, prior to allowing a player to make a selection of one or more of the markers 94, one or more game enhancement parameters are awarded based on the player's selected thematic indicia set in a similar manner as described above. One non-limiting example of such a game enhancement parameter includes awarding a player one or more extra selection from the markers 94. For example, the bonus-game screen 92 can include a popup window that states "If Tin Man Get 2 Extra Picks."

Each of these embodiments and obvious variations thereof is contemplated as falling within the spirit and scope of the claimed invention, which is set forth in the following claims.

What is claimed is:

1. A method of conducting a wagering game on a gaming terminal for a player, the method comprising:

receiving, via an input device, a player selection of one of a plurality of player selectable elements, each of the player selectable elements being associated with a corresponding thematic indicia set, the thematic indicia sets being different for at least two of the player selectable elements;

conducting the wagering game with the thematic indicia set associated with the selected player selectable element being displayed on a display of the gaming terminal;

while conducting the wagering game, triggering a bonus event; and awarding one of a plurality of game enhancement parameters to the player during the bonus event, the awarded one of the plurality of game enhancement parameters being dictated by the selected player selectable element.

2. The method of claim 1, wherein the awarded one of the plurality of game enhancement parameters is dictated by the selected player selectable element and a player achieving certain criteria.

3. The method of claim 2, wherein the certain criteria relates to a rate at which a player places wagers in the wagering game.

4. The method of claim 1, wherein the awarded game enhancement parameter is displayed on a community display.

5. The method of claim 1, wherein the bonus event includes one or more free plays of the wagering game.

6. The method of claim 1, wherein the plurality of game enhancement parameters include multipliers, wild reels, wild symbols, and reel nudges.

7. The method of claim 1, further comprising conducting the bonus event with the awarded game enhancement parameter being automatically applied.

8. The method of claim 1, further comprising awarding a second one of the plurality of game enhancement parameters to the player during the bonus event, the second awarded game enhancement parameter being dictated by the selected player selectable element.

9. The method of claim 1, wherein the awarding includes:

(i) randomly selecting, via one or more processors, one of the plurality of player selectable elements to which to award the game enhancement parameter, and (ii) providing the player with the game enhancement parameter in response to the randomly selected player selectable element matching the player's selected player selectable element.

10. The method of claim 1, further comprising:

concluding a first play of the wagering game on the gaming terminal;

in response to the concluding of the first play, receiving, via the input device, a second player selection of a different one of the plurality of player selectable elements;

conducting a second play of the wagering game with the thematic indicia set associated with the different one of the player selectable elements being displayed on the display of the gaming terminal; and while conducting the second play of the wagering game, triggering a second bonus event.

11. The method of claim 10, further comprising awarding a second one of the plurality of game enhancement parameters to the player during the second bonus event, the awarded second one of the plurality of game enhancement parameters being dictated by the different selected one of the player selectable elements.

12. The method of claim 10, further comprising displaying a second one of the plurality of game enhancement parameters that could be awarded to the player during the second bonus event, the player not being awarded the second one of the game enhancement parameters due to the different selected one of the player selectable elements not matching a randomly selected player selectable element selected by a processor.

13. A method of conducting a wagering game on a gaming terminal for a player, the method comprising:

receiving, via an input device, a player selection of one of a plurality of player selectable elements, each of the player selectable elements being associated with a corresponding thematic indicia set, the thematic indicia sets being different for at least two of the player selectable elements;

conducting the wagering game with the thematic indicia set associated with the selected player selectable element being displayed on a display of the gaming terminal;

while conducting the wagering game, triggering a bonus event;

randomly selecting, via one or more processors, one of a plurality game enhancements parameters, the randomly selected game enhancement parameter being associated with one of the plurality of player selectable elements; and in response to the player selected player-selectable element matching the player selectable element associated with the randomly selected game enhancement parameter, awarding the randomly selected game enhancement parameter to the player during the bonus event.

14. The method of claim 13, wherein the awarded game enhancement parameter is dictated by the selected player selectable element and a player achieving certain criteria.

15. The method of claim 14, wherein the certain criteria relates to a rate at which a player places wagers in the wagering game.

16. The method of claim 13, further comprising conducting the bonus event with the awarded game enhancement parameter being automatically applied.

17. The method of claim 13, wherein the conducting the wagering game with the thematic indicia set associated with the selected player selectable element includes modifying a basic set of symbols of the wagering game to include indicia from the thematic indicia set associated with the selected player selectable element.

18. The method of claim 17, wherein the conducting the wagering game with the thematic indicia set associated with the selected player selectable element further includes modifying a basic skin of the wagering game.

19. A method of conducting a wagering game on a plurality of gaming terminals networked with a server, the method comprising:

receiving, via a first input device on a first gaming terminal, a first selection of a first one of a plurality of player selectable elements by a first player, each of the player selectable elements being associated with a corresponding thematic indicia set;

receiving, via a second input device on a second gaming terminal, a second selection of a second one of the plurality of player selectable elements by a second player, the second one of the plurality of player selectable elements being different from the first one of the plurality of player selectable elements and having a different thematic indicia set associated therewith;

conducting the wagering game on the first gaming terminal with the thematic indicia set associated with the first selection being displayed on a display of the first gaming terminal;

conducting the wagering game on the second gaming terminal with the different thematic indicia set associated with the second selection being displayed on a display of the second gaming terminal;

while conducting the wagering games on the first gaming terminal and the second gaming terminal, triggering a bonus event;

randomly selecting, via one or more processors in the server, one of the plurality of player selectable elements to which to provide a game enhancement parameter; and awarding the game enhancement parameter to the first player during the bonus event due to the first player's selected player selectable element matching the randomly selected player selectable element.

20. The method of claim 19, further comprising randomly selecting, via the one or more processors in the server, one of a plurality of game enhancement parameters to be awarded, the randomly selected game enhancement parameter being associated with the first one of the plurality of player selectable elements.

21. The method of claim 19, further comprising:

conducting a second play of the wagering game on the first and the second gaming terminals;

while conducting the second play of the wagering games on the first gaming terminal and the second gaming terminal, triggering a second bonus event;

in response to the triggering of the second bonus event, randomly selecting, via the one or more processors in the server, a second one of the plurality of player selectable elements to which to provide a second game enhancement parameter; and awarding the second game enhancement parameter to the second player during the second bonus event due to the second player's selected player selectable element matching the randomly selected second player selectable element.

22. The method of claim 21, further comprising in response to the triggering of the second bonus event, randomly selecting, via the one or more processors in the server, a second one of the plurality of game enhancement parameters to be awarded, the randomly selected second game enhancement parameter being associated with the second one of the plurality of player selectable elements.

23. A gaming terminal for conducing a wagering game, the gaming terminal comprising:

at least one input device configured to receive a selection of one of a plurality of player selectable elements from a player, each of the player selectable elements being associated with a corresponding thematic indicia set;

at least one display configured to display the wagering game with the thematic indicia set associated with a selected one of the player selectable elements; and at least one processor configured to:

trigger a bonus event;

randomly select one of the plurality of player selectable elements to which to award a game enhancement parameter; and award the game enhancement parameter to the player in response to the player's selected player selectable element matching the player selectable element randomly-selected by the at least one processor.

24. The gaming terminal of claim 23 wherein the at least one processor is further configured to randomly select one of a plurality of game enhancement parameters to be awarded.

25. The gaming terminal of claim 23, further comprising a wager acceptor configured to receive a wager from a player of the gaming terminal to initialize the wagering game.

26. The gaming terminal of claim 23, wherein the awarded game enhancement parameters is dictated by the selected player selectable element and a player achieving certain criteria, the certain criteria relating to a rate at which the player places wagers in the wagering game.

* * * * *